United States Patent [19]

Struthers

[11] Patent Number: 4,492,741
[45] Date of Patent: Jan. 8, 1985

[54] BORON MONOXIDE-HYDROGEN PEROXIDE FUEL CELL

[76] Inventor: Ralph C. Struthers, 39503 Calle El Fuente, Saugus, Calif. 91350

[21] Appl. No.: 563,464

[22] Filed: Dec. 20, 1983

[51] Int. Cl.$^3$ .............................................. H01M 8/22
[52] U.S. Cl. ........................................ 429/34; 429/41; 429/101; 429/105
[58] Field of Search ........................ 429/34, 41, 13, 14, 429/15, 38, 101, 105

[56] References Cited

U.S. PATENT DOCUMENTS

| | | | |
|---|---|---|---|
| 4,352,864 | 10/1982 | Struthers | 429/14 X |
| 4,363,855 | 12/1982 | Winsel | 429/101 |
| 4,382,116 | 5/1983 | Gahn et al. | 429/40 X |
| 4,443,522 | 4/1984 | Struthers | 429/18 |

Primary Examiner—Anthony Skapars
Attorney, Agent, or Firm—Georges A. Maxwell

[57] ABSTRACT

A primary fuel cell including an elongate case defining a central ion exchange compartment with opposite ends and containing a liquid ionolyte. The case next defines an anode section at one end of the case and including a gas compartment containing boron monoxide gas fuel, a liquid compartment between the gas compartment and the ion exchange compartment and containing a liquid anolyte. The ionolyte and anolyte are separated by a cationic membrane. The gas and liquid compartments are separated by an anode plate including an electron collector part, a catalyst material carried by said part and a gas permeable hydrophobic membrane between the boron monoxide gas and the catalyst material. The cell further includes a cathode section at the other end of the case defining a cathode fuel compartment containing a fluid cathode fuel and a cathode plate between and separating the cathode fuel and the ionolyte in the ion exchange compartment. The cathode plate includes an electron distributor part and a catalyst material carried by the distributor part. If the cathode fuel is a gas fuel, the cathode plate also includes a gas permeable hydrophobic membrane between the catalyst material carried by the distributor part and the cathode fuel. The cathode and anode plates have terminals connected with a related external electric circuit.

17 Claims, 10 Drawing Figures

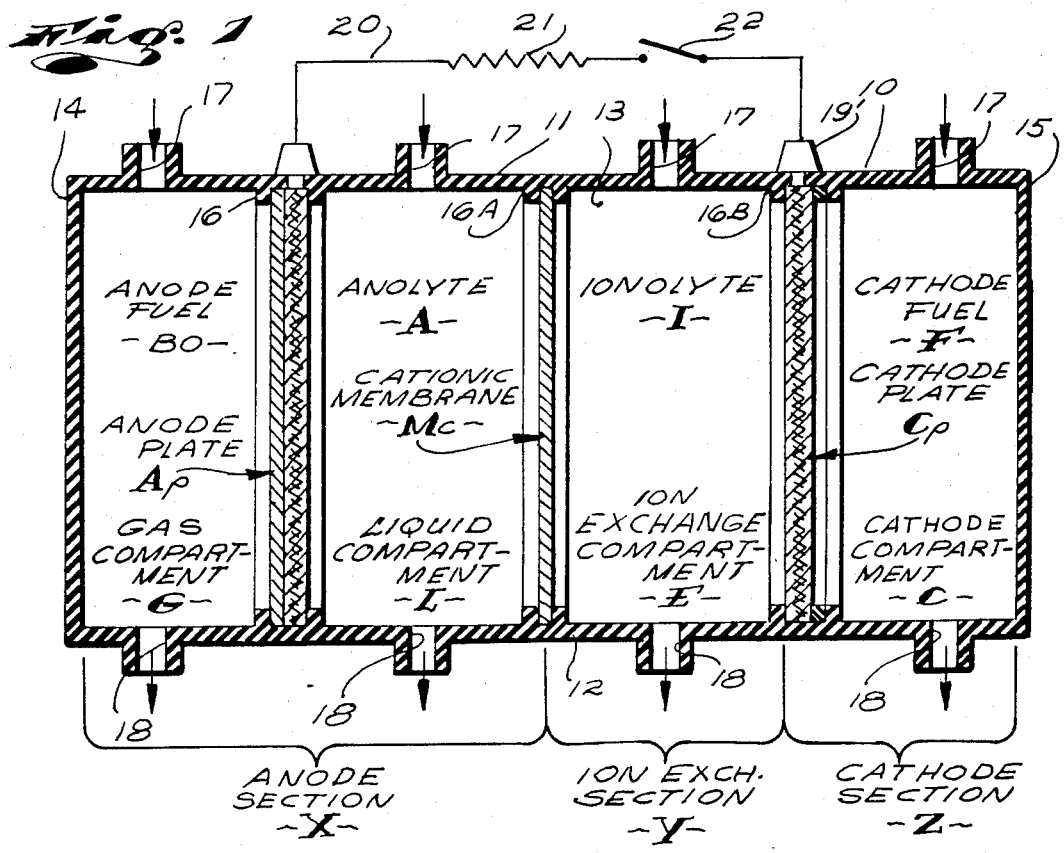
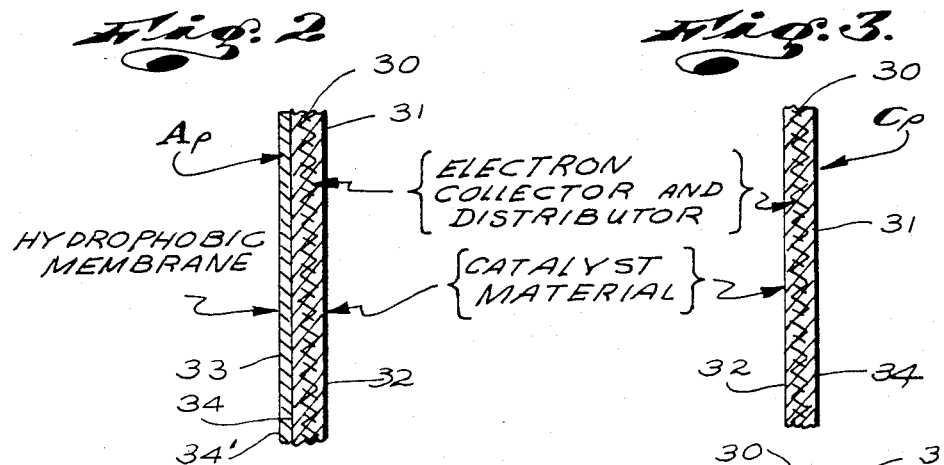
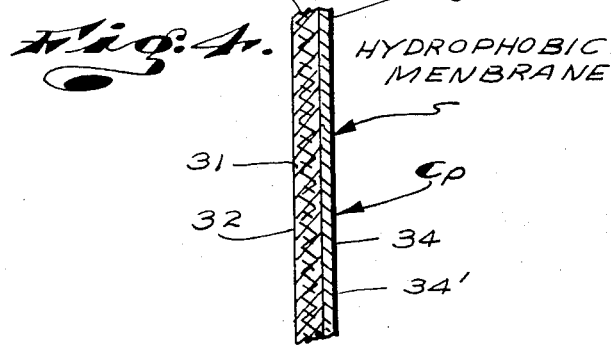

Fig. 5.

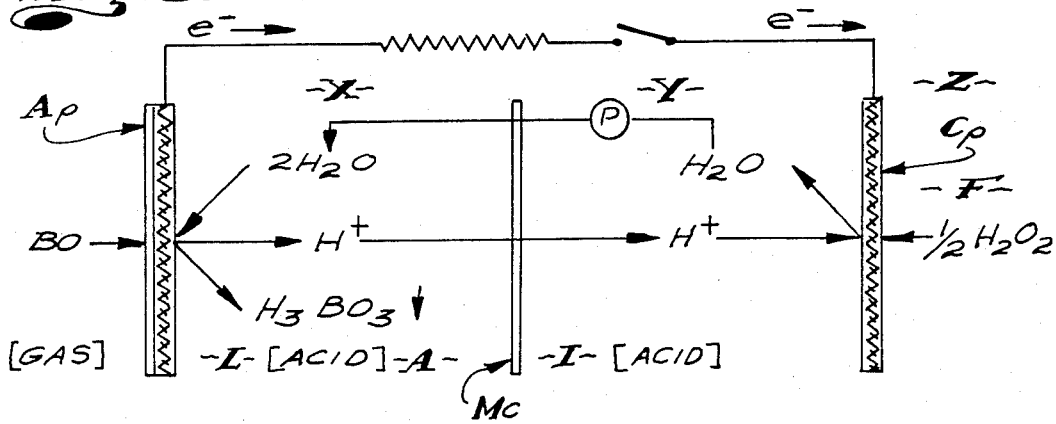

Fig. 6.

ANODE : $BO + 2H_2O \rightarrow H_3BO_3\downarrow + H^+ + e^-$    $E_{ox} = 4.219$
CATHODE: $\frac{1}{2}H_2O_2 + H^+ + e^- \rightarrow H_2O$    $E_{RED} = 1.776$
NET CELL : $BO + \frac{1}{2}H_2O_2 + H_2O \rightarrow H_3BO_3\downarrow$    $E_{CELL} = 5.995$

Fig. 7.

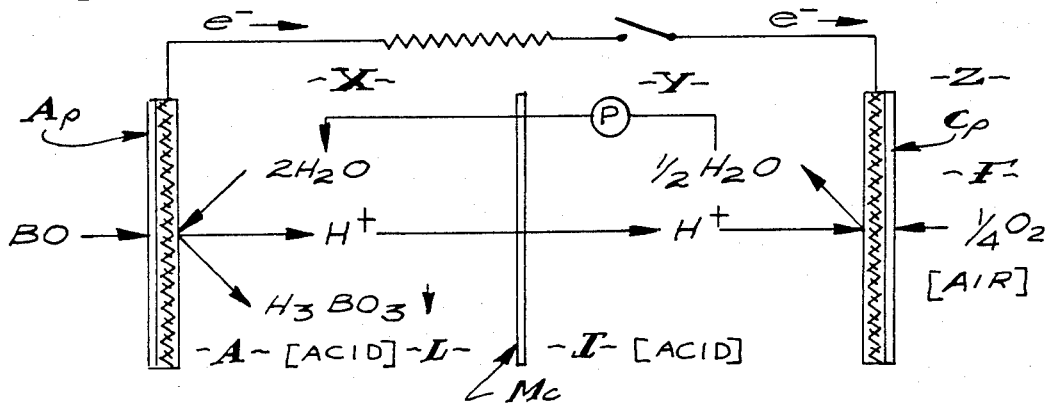

Fig. 8.

ANODE : $BO + 2H_2O \rightarrow H_3BO_3\downarrow + H^+ + e^-$    $E_{ox} = 4.219$
CATHODE : $\frac{1}{4}O_2 + H^+ + e^- \rightarrow \frac{1}{2}H_2O$    $E_{RED} = 1.229$
NET CELL : $BO + \frac{1}{4}O_2 + \frac{3}{2}H_2O \rightarrow H_3BO_3\downarrow$    $E_{CELL} = 5.448$ CATHODE: $H_3BO_3 + H^+ + e^- \rightarrow BO\uparrow + 2H_2O$
ANODE: $\frac{1}{2} H_2O \rightarrow \frac{1}{2} O_2\uparrow + H^+ + e^-$
NET CELL: $H_3BO_3 + \frac{1}{2} H_2O \rightarrow BO\uparrow + \frac{1}{4} O_2\uparrow + 2H_2O$

BORON MONOXIDE-HYDROGEN PEROXIDE FUEL CELL

This invention has to do with a novel fuel cell and is particularly concerned with a boron monoxide fuel cell.

BACKGROUND OF THE INVENTION

In the art of primary fuel cells, the power output of fuel cells is determined in large part by the energetic nature and/or character of the fuel elements that are selected and used. In the selection of the fuel elements to be used in fuel cells, great care is used to select and put to use those combinations of elements which are such that the chemical reactions within their related fuel cells is predeterminable, manageable and safe, and which is both effective and efficient to generate desired electric power.

In practice, as the power output requirements of fuel cells increases, the numbers of suitable fuel and combinations of fuel markedly decreases. This is due to the fact that increases in the power output of cells requires the selection and use of more energetic fuel elements and attending or corresponding increases in chemical activity, coupled with the fact that as the energetic characteristics of elements, suitable for use in fuel cells, increases, their chemical stability and suitability for use in fuel cells markedly diminishes and their physical or structural nature and/or character, as regards their suitability for use in fuel cells, diminishes.

In accordance with the foregoing, while the prior art has found little difficulty in the development and provision of primary fuel cells having low to moderate power output, the development and provision of fuel cells having great or high power output has been notably limited. As a general rule, it can be said that as the power output of fuel cells is increased, the latitude of the selection of fuel elements that can be used and the latitude of the design of cell structures suitable for the handling and use of those fuel elements decreases at a notable rate and practical limits are soon reached. In accordance with the teachings of the prior art, the above referred to practical limits have been reached without having put those elements which are known to be the most energetic elements to practical use.

In determining what elements are or might be most energetic for use in primary fuel cells, the mean electrical potential of the elements, when fully oxidized, is looked to. The higher that potential, the more energetic the element would be, if and when put to effective use in a primary fuel cell.

In furtherance of the above, the mean electrical potential of an element is generally expressed in terms of watt hours per kilogram of the element. The watt hour per kilograms is determined by and/or expressed in the formula $$Wh/Kg = \frac{\bar{\bar{E}}^\circ \times \bar{\bar{V}} \times 26{,}810.0}{\bar{A}}$$

wherein $\bar{E}^\circ$ of the nominator is the mean potential of the element, $\bar{V}$ of the nominator is the mean valence of the element, and the denominator $\bar{A}$ is the mean atomic weight of the element. The watt hours per kilogram determined by the foregoing formula is expressed by the voltage output attainable when the element is fully oxidized.

In accordance with the above, it will be apparent and it is readily determinable that the lower the atomic weight (the denominator $\bar{A}$) and the higher the mean potential ($\bar{E}$) and valence ($\bar{V}$) of an element, the more energetic it will be in a primary fuel cell, if its use in such a cell is not otherwise limited or prohibited by one or more of its other characteristics.

In furtherance of the above, it will be apparent that the more energetic elements can be expected to be and are in fact found in those elements having low atomic weight.

Referring to the periodic table of elements, it is apparent that the energetic elements are in period 2. Most notable in the period 2 elements is the element boron (B), the atomic weight of which is 10.82. In accordance with the above noted formula, boron is potentially a very energetic or high powered element. The most notable factors which make boron unsuitable for use as a fuel in primary fuel cells are the fact that it is an extremely poor conductor of electricity with a resistance of $1.8 \times 10^{12}$ micro ohms centimeters and is a solid element which is not sufficiently strong and stable to lend itself to being effectively handled, worked with and used in most of those fuel cell structures that have been provided by the prior art.

As a result of the high electrical resistance of boron and due to its physical characteristics, the prior art has apparently and is understood and believed to have determined that while boron has certain characteristics which indicate that it might be an effective highly energetic fuel element for use in fuel cells, it is rendered unsuitable for such use due to its exceedingly high electrical resistance.

OBJECTS AND FEATURES OF MY INVENTION

It is an object of my invention to provide a novel high power output primary fuel cell in which the element boron is used as the anode fuel.

It is an object and feature of the invention to provide a fuel cell of the character referred to wherein the anode fuel is boron monoxide gas.

Yet another object and feature of my invention is to provide a fuel cell of the general character referred to above wherein the anode fuel is boron monoxide and wherein either oxygen or hydrogen peroxide are used as cathode fuel.

It is yet another object and feature of my invention to provide a novel fuel cell of the general character referred to above which includes an anode section comprised of an anode plate with an electron distributor and collector part, a catalyst and a gas permeable hydrophobic membrane arranged between and separating a supply of boron monoxide gas and an aqueous anolyte solution; and a cathode section including a cathode plate with an electron distributor and collector part and a catalyst disposed between the supply of hydrogen peroxide cathode fuel and an ion exchange electrolyte solution and wherein the anolyte and ion exchange solutions are separated by a cationic membrane.

It is an object and feature of my invention to provide a novel fuel cell of the general character referred to above which includes an anode section comprising an anode plate with an electron distributor and collector part, a catalyst and a gas permeable hydrophobic membrane disposed between a supply of boron monoxide and an anolyte solution and a cathode section including a cathode plate with an electron distributor and collector part, a gas permeable hydrophobic membrane and a catalyst disposed between a supply of oxygen and an ion exchange electrolyte solution and wherein the anolyte and ionolyte solutions are separated by a cationic membrane.

It is an object and feature of my invention to provide a novel and improved primary fuel cell of the general character referred to above which is such that upon complete oxidation of the boron monoxide fuel and upon maximum usage of the hydrogen peroxide or oxygen cathode fuel, a theoretical net cell voltage of 5.995 or 5.448 is attained.

The foregoing and other objects and features of my invention will be fully understood from the following detailed description of two typical preferred forms and applications of my invention, throughout which description reference is made to the accompanying drawings.

DESCRIPTION OF THE DRAWINGS

FIG. 1 is a diagrammatic view of a cell embodying my invention;

FIG. 2 is an enlarged sectional view of an anode plate structure suitable for carrying out my invention;

FIG. 3 is an enlarged sectional view of a portion of a cathode plate structure suitable for carrying out my invention;

FIG. 4 is an enlarged sectional view of a portion of another form of cathode plate structure suitable for carrying out my invention;

FIG. 5 is a diagrammatic view of one embodiment of the invention;

FIG. 6 sets forth the chemical formula describing the operation of the cell structure shown in FIG. 5;

FIG. 7 is a diagrammatic view of another embodiment of my invention;

FIG. 8 sets forth the chemical formulas describing the operation of the fuel cell structure shown in FIG. 7 of the drawings;

DESCRIPTION OF THE INVENTION

Figures 9, 10:
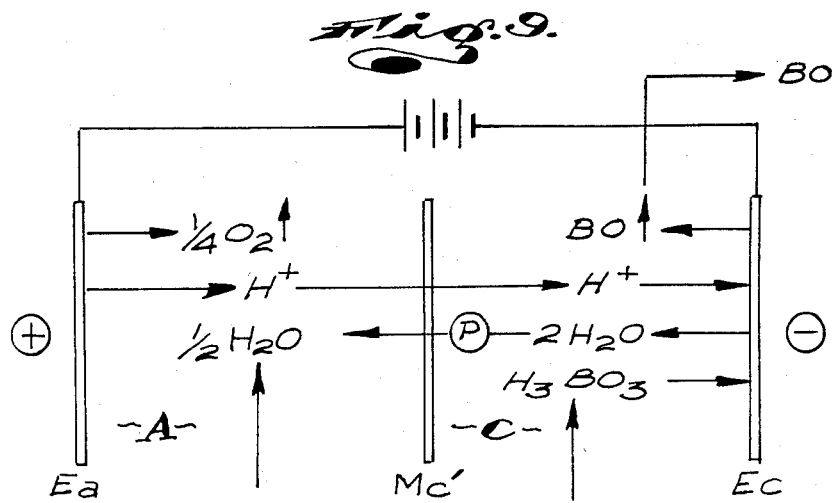
FIG. 9 is a diagrammatic view of an apparatus for generating boron monoxide gas.
FIG. 10 sets forth the chemical formulas describing the operation of the apparatus shown in FIG. 9.

In FIG. 1 of the drawings, I have shown one typical type of fuel cell structure embodying and/or suitable for carrying out my invention. The cell structure includes an elongate case 10 with top, bottom and side walls 11, 12 and 13 and opposite end walls 14 and 15. The case 10 is established of chemically inert dielectric material and is provided with three longitudinally spaced partition and/or plate mounting means 16, 16-A and 16-B, spaced from and between the end walls and defining, from left to right, an anode gas compartment G, an anode liquid compartment L, an ion exchange compartment E and a cathode fuel compartment C, as clearly labeled in FIG. 1 of the drawings.

The case 10 is provided with one or more ports communicating with each of the compartments G, L, E and C. For example, and as shown, the top and bottom walls of the case have inlet and outlet ports 17 and 18 related to and communicating with each of the noted compartments. The ports 17 and 18 provide for the introduction of gases and/or liquids into the compartments, exhausting or draining such mediums therefrom or for effecting the circulation of such mediums therethrough, as desired or as circumstances might require.

In addition to the above, the fuel cell structure includes an anode plate Ap, sealingly engaged in and with the mounting means 16 and separating the compartments G and L; a cationic membrane Mc, sealingly engaged in and with the mounting means 16-A and separating the compartments L and E and a cathode plate Cp engaged in the means 16-B and separating the compartments E and C.

The anode plate Ap and cathode plate Cp are shown provided with terminal posts 19 and 19' accessible at the exterior of the case 10. An external electric circuit 20 is connected with and between the posts 19 and 19'. The circuit 20 is shown as including a resistance 21 which represents a workload and an on and off switch 22.

Finally, the structure shown in FIG. 1 is provided with or contains a supply of boron monoxide gas anode fuel BO in the compartment G, a supply of liquid anolyte A in the compartment L, a supply of liquid ionolyte I in the compartment E and a supply of fluid cathode fuel F in the compartment C.

In practice, the several fluids BO, A, I and F can be statically contained in their related compartments of the cell structure and can be intermittently drained and replenished or can be continuously circulated in and through the related compartments, as desired or as circumstances require.

It will be noted that the compartments G and L, plate Ap, anode fuel BO, the anolyte A, and the membrane Mc cooperate to define an anode section X in the cell structure. The membrane Mc, compartment E, and ionolyte I and the plate Cp cooperate to define an ion exchange section Y in the cell. The plate Cp, compartment C and fuel F cooperate to define a cathode section Z in the cell structure. The several sections X, Y and Z are clearly bracketed and labeled in FIG. 1 of the drawings.

The anode fuel BO in the gas compartment G of the anode section X is boron monoxide gas. The anolyte A in the liquid compartment L of the section X is a suitable acid eletrolyte.

The anode plate AP, the structure of which is best shown in FIG. 2 of the drawings, is a flat, vertical plate-like structure and includes an electron collector and distributor part 30 in the form of a perforated foil or sheet metal plate or in the form of a woven metal fabric sheet. The part 30 is coextensive with the plane of the plate and is connected with the terminal post 19. The plate Ap next includes a panel like body, coating or laminate of catalyst material 31 carried by the part 30. The catalyst 31 is preferably made of a high surface area particulate catalyst material, such as particulate carbon, and is such that it establishes many active sites to support effective chemical reaction throughout the plane of the plate. The plate Ap has an inner surface 32 defined by the catalyst 31 and which is in wetted contact with the anolyte A. The plate Ap next and finally includes a thin, gas-permeable hydrophobic membrane 33 which overlies its other or outer surface 34. The membrane 33 has an outer surface 34' which is contacted by the anode fuel BO in the gas compartment G of the cell structure. The membrane 33 allows the gas fuel BO to move into the anolyte wetted catalyst 31 while preventing the anolyte A from moving outward from the plate Ap and into the compartment G.

The details of construction and the materials used to establish the plate Ap are subject to considerable variation without departing from the broad aspects and spirit of my invention and without notable adverse effects as regards the operation of functioning of the cell.

The cationic membrane Mc is a thin, flat sheet or panel of material selected from a large group of non-porous, membrane materials which are effective to allow for the substantial free movement of positive charged ions therethrough and which effectively prevent the movement of liquids therethrough.

The ionolyte I in the ion exchange compartment E of the cell section Y is an acid electrolyte solution similar to the anolyte A.

The anolyte A and ionolyte I are maintained separate one from the other by the cationic membrane MC, which membrane, as previously noted, allows for the free movement of positive ions through it from one of said compartments to the other.

The cathode plate Cp is provided in two different forms, one for use when the cathode fuel is a liquid, such as hydrogen peroxide, and the other for use when the cathode fuel is a gas, such as oxygen (from the air).

Both forms of cathode plates, as shown in FIGS. 3 and 4 of the drawings, include an electron collector and distributor part 30 similar to the part 30 in the anode plate Ap. The part 30 of the cathode plate Cp is connected with the terminal 19'.

Each form of cathode plate Cp next includes a catalyst 31 similar to the catalyst 31 of the anode plate AP.

When the cathode fuel F is a liquid such as hydrogen peroxide, the cathode plate Cp includes no more than the above noted part 30 and catalyst 31, as clearly shown in FIG. 3 of the drawings. When the cathode fuel F is a gas, such as oxygen, the plate Cp, in addition to the part 30 and catalyst 31, includes or has added to it a gas-permeable hydrophobic membrane 33, similar to the membrane 33 of the plate Ap and which is disposed toward the cathode compartment C, as clearly shown in FIGS. 4 and 7 of the drawings.

In both forms of cathode plates, the catalyst 31 defines an inner surface 32 which is in contact with and wetted by the anolyte I and has an outer surface 34 which is either wetted by a liquid cathode fuel or receives gas cathode fuel conducted through an adjacent related gas-permeable hydrophobic membrane.

In the form of cathode plate Cp, provided for use when the cathode fuel F is a liquid and as shown in FIGS. 3 and 5 of the drawings, the outer surface 34 of the plate and defined by the catalyst 31 is contacted and wetted by the liquid fuel F.

In the form of cathode plate Cp, when the cathode fuel F is a gas and as shown in FIGS. 4 and 7 of the drawings, the membrane 33 which has an outer surface 34 in contact with the gas fuel F in the cathode compartment C, conducts the gas fuel to the catalyst 31 while stopping the flow of ionolyte I through the plate and into the cathode compartment C.

The cathode plate Cp in both of its noted forms separates the ion exchange and cathode compartments E and C and the ionolyte I and cathode fuel F therein.

When the cathode fuel F is liquid or gas, that fuel fills the cathode compartment C and contacts the outer surface of the cathode plate Cp.

It will be noted that when the cathode fuel F is oxygen, taken from the air, the end of the case 10 defining the cathode compartment C can be opened or substantially cut away so as to expose the outer surface of the cathode plate Cp to the ambient air.

In the following description of the operation of my new fuel cell, those chemical reactions which take place in the anode, ion exchange and cathode sections X, Y and Z will be given independent consideration.

In both embodiments of my invention, that is, when the cathode fuel F is either a gas or a liquid, boron monoxide gas BO is the anode fuel and is supplied to the outer surface of the anode plate Ap. The gas anode fuel reacts with the water ($H_2O$) of the anolyte A at the plate Ap and results in the generating of one hydrogen ion ($H^+$), one free electron ($e^-$) and boric acid ($H_3BO_3$), which acid is the byproduct of fuel cell reaction.

The hydrogen ion ($H^+$) moves through the anolyte A, cationic membrane Mc, ionolyte I and to the cathode plate Cp.

Free electrons $e^-$ are conducted from the plate Ap into and through the external electric circuit 20.

As the anolyte becomes ladened with the boric acid byproduct ($H_3BO_3$), the boric acid can be precipitated and collected for salvage and for the generating of boron monoxide gas, as will hereinafter be described.

The free electrons $e^-$ released by chemical reaction at the anode plate Ap and conducted through the external circuit 20, after performing useful work, are conducted to the cathode plate Cp by and through the circuit 20 to establish and maintain the desired chemical reaction which takes place between the ion and cathode sections Y and Z of the cell, at the plate Cp. So long as the external circuit 20 is maintained closed and free electrons are conducted from the anode plate Ap to the cathode plate Cp, fuel cell reaction and the generating of useful electric power continues.

The hydrogen ions ($H^+$) moving from the anode section X through the membrane Mc and ion exchange section Y to the cathode plate Cp react at the plate Cp to generate water ($H_2O$) which is added to the ionolyte I in the ion exchange section Y.

In practice, boric acid ladened anolyte A in the compartment L of the anode section X can be conducted from the compartment L for the purpose of precipitating and salvaging the boric acid. In practice, after the boric acid has been precipitated and removed from the anolyte, the remaining boric acid free anolyte can be returned to the compartment L. Still further, in practice, the extra water ($H_2O$) generated by cathode reaction and added to the ionolyte I can be transported or transferred, as by means of a pump, from the ion exchange compartment E into the liquid compartment L and added to the anolyte A to replenish or help to replenish the supply of anolyte, during fuel cell operation.

Considering the chemical reaction in the cathode section Z and at the cathode plate Cp, the cathode fuel F, whether it be a liquid such as hydrogen peroxide ($H_2O_2$) or a gas, such as oxygen ($O_2$) from the air, is supplied to the outer surface of the plate Cp. The fuel F reacts with the free electron ($e^-$) conducted into the plate by the external circuit 20, to form the previously referred to water ($H_2O$) which is added to the ionolyte I.

In the form of the invention shown in FIGS. 5 and 6 of the drawings, wherein the cathode fuel F is hydrogen peroxide ($\frac{1}{2} H_2O_2$), the hydrogen peroxide is supplied to the outer surface of the cathode plate Cp and the single hydrogen ions ($H^+$) are supplied to the inner surface thereof by the anode section X of the cell and the single free electron ($e^-$) are supplied by the external circuit 20. The foregoing generates a one-half cell cathode voltage of 1.776 volts and one molecule of water ($H_2O$).

In the form on the invention shown in FIGS. 7 and 8 of the drawings, wherein the cathode fuel is oxygen (¼ $O_2$) taken from the air, the oxygen is supplied to the outer surface of the cathode plate Cp, the single hydrogen ions ($H^+$) are supplied to the inner surface of the plate Cp by the anode section X and the free electrons ($e^-$) are supplied to the plate Cp by the external circuit 20. The foregoing generates a one-half cell cathode voltage of 1.229 and water molecules (½ $H_2O$).

As previously noted, the watt hours per kilogram of an anode fuel is expressed by the formula $$Wh/Kg = \frac{\overline{E} \times \overline{V} \times 26,810.0}{A}$$

where $\overline{E}$ is the net fuel cell potential, $\overline{V}$ is the valence and $\overline{A}$ is the atomic weight of the fuel element. Determination of the kilowatt hours per kilogram established in accordance with the above formula is the output attainable when the anode fuel is fully oxidized.

When establishing a high power output fuel cell, it is necessary that the anode fuel element have the lowest possible or practical atomic weight, the highest electric potential and the highest valence. With low atomic weight, the denominator ($\overline{A}$) in the noted formula is low and with high electric potentials and high valences, the nominators are high. In accordance with the foregoing, boron, from which the gas fuel is derived, has an atomic weight of 10.811, an electric potential of 5.995 and a valence of 3, the kilowatt hours per kilogram thereof is 44,600.7. Thus, it will be apparent that boron (BO), whether in its natural solid state or as the gas boron monoxide, is a highly energetic fuel cell fuel.

The poor electric conducting characteristics of boron are eliminated or overcome by my invention by using the element in its gaseous state, whereby it is readily and effectively supplied to the catalyst 31 of the anode plate and wherein the electron collector and distributor part 30 of that plate functions to conduct the free electrons from the cell structure and into the external circuit 20. Thus, the anode fuel BO is not required to be or utilized as a conductor and its poor electric conducting characteristics have no adverse effects on the effective and efficient operation of the cell.

In the form or embodiment of my invention where the cathode fuel is hydrogen peroxide, the cathode half cell voltage is 1.776 whereas when the cathode is oxygen, the cathode half section voltage is 1.229. Thus, when the cathode fuel in my cell is hydrogen peroxide, the net fuel cell voltage is 5.995 and when the cathode fuel is oxygen, the net fuel cell voltage is 5.448. In both forms or embodiments of my invention, the power output of the cell or cells is exceedingly high.

In practice, it is contemplated that when air is available and can be used as a supply of oxygen as the cathode fuel in my cell or cells, oxygen is the preferred cathode fuel. Accordingly, it is contemplated that hydrogen peroxide or other suitable or desired fuel element will only be used in those circumstances where air as a supply of oxygen fuel is not available or cannot be effectively utilized.

During fuel cell operation, the reactions taking place within the cell structure generate heat and the temperature within the cell, at the plates Ap and Cp, and the temperature of the fluid mediums affects the efficiency and effectiveness of the cell. Accordingly, in practice, it is contemplated that the several fluid mediums will be handled and supplied to the cell by suitable fluid handling support means or apparatus which will function to temper the fluid mediums and circulate them through their related compartments of the cell to maintain the several sections of the cells and all of the components thereof at safe and effective operating temperature. Since the exact nature and form such support means or apparatus might take can vary widely in practice and since such means or apparatus are outside the scope of the present invention, I have elected not to burden this disclosure by illustrating and describing any particular support means or apparatus that might be provided and used for such purposes.

While it is apparent, it is nonetheless noted that in practice the basic cell structure that I provide is such that cells of different size can be provided and is such that pluralities of such cells of suitable size can be related to each other to establish batteries of cells having cumulative power outputs which will meet different specific power requirements.

During development of my invention, I found that boron monoxide gas was not commercially available. Accordingly, it was necessary that I develop and utilize an apparatus to generate boron monoxide gas. In FIG. 9 of the drawings, I have diagrammatically illustrated that boron monoxide gas generating electrolytic cell G that I have used to generate boron monoxide gas. In FIG. 10 of the drawings, I have set forth the formulas of cathode and anode reaction and the net cell reaction of the noted electrolytic cell.

The apparatus shown in FIG. 9 is a two compartment electrolytic cell which includes and anode compartment A' and a cathode compartment C. The compartments A' and C' are separated by a cationic membrane Mc'. The anode compartment is filled with a suitable anodic electrolyte solution and an anode electrode Ea is immersed in the anolyte. The cathode compartment is filled with an aqueous boric acid solution or catholyte electrolyte and a cathode electrode Ec' is immersed in it. The anode and cathode electrodes are connected with the positive and negative sides of an external direct current power supply.

With the above noted apparatus or electrolytic cell, the conversion of boric acid to boron monoxide gas involves water molecules being oxidized in the anode compartment A' to produce oxygen gas ($O_2$) and hydrogen ions ($H^+$). The hydrogen ions move from the compartment A' through the cationic membrane Mc' into the cathode compartment C' and thence to the cathode electrode where a reaction takes place which results in decomposition of boric acid ($H_3BO_3$) and the formation of water molecules and boron monoxide (BO). The boron monoxide is conducted away from the electrolytic cell for subsequent use as anode fuel in my new fuel cell.

It will be apparent that the salvaged boric acid precipitated from the anolyte A in my fuel cell can be advantageously used in the above electrolytic cell to produce new boron monoxide to fuel the fuel cell. Theoretically, if properly managed, once suitable supplies of boric acid and boron monoxide gas are established to maintain operation of my new fuel cell and the gas generating electrolytic cell, little or no boric acid or boron monoxide need be provided.

For effective and efficient generating of boron monoxide gas by means of the electrolytic cell diagrammatically illustrated in the drawings and briefly described above, a number of operating parameters must be established and maintained. Cell voltage, current density, temperature, the conductivity or resistance of parts and materials and the spacial relationship of parts are some of the more important parameters which require special attention. Since such operating parameters are interrelated and must be carefully balanced, one relative to the other, and since they are subject to notable variations when any one or more of them is caused to change, further detailed consideration and/or explanation of the gas generating electrolytic cell would serve little purpose and will be dispensed with.

It is understood and believed that other means or apparatus and special techniques which are likely to be better suited than my above noted gas generating electrolytic cell are known in the art and might be best adopted and used when regular ongoing supplies of such gas are required.

Having described only typical preferred forms or embodiments of my invention, I do not wish to be limited to the specific details herein set forth but wish to reserve to myself any modifications and/or variations that might appear to those skilled in the art and which fall within the scope of the following claims:

Having described my invention, I claim:

1. A boron monoxide fueled primary fuel cell comprising an elongate case structure having a central ion exchange section defining an ion exchange compartment with opposite ends and containing a fluid ionolyte, an anode section at one end of the case defining a gas compartment containing fluid boron monoxide gas, a liquid compartment between the gas compartment and one end of the ion exchange compartment and containing a fluid anolyte, a cationic membrane is disposed between and separates the anolyte and ionolyte, an anode plate is disposed between and separates the boron monoxide gas and the anolyte, said anode plate includes an electron collector part which is substantially coextensive with the interface between the boron monoxide gas and the anolyte and is connected with a terminal which connects with a related external electric circuit, a catalyst material carried by the collector part and a gas permeable hydrophobic membrane at the interface between and separating the boron monoxide and the catalyst material, a cathode section at the other end of the case defining a cathode fuel compartment adjacent the other end of the ion exchange compartment and containing a fluid cathode fuel and a cathode plate is disposed between and separates the ionolyte and the cathode fuel, said cathode plate includes an electron distributor part substantially coextensive with the interface between the ionolyte and cathode fuel and is connected with a terminal connected with said external circuit and a catalyst material carried by the distributor part.

2. The boron monoxide fueled primary fuel cell set forth in claim 1 wherein the ionolyte is a liquid electrolyte and the cathode fuel is a liquid fuel.

3. The boron monoxide fueled primary fuel cell set forth in claim 1 wherein the ionolyte is a liquid electrolyte and the cathode fuel is hydrogen peroxide.

4. The boron monoxide fueled primary fuel cell set forth in claim 1 wherein the ionolyte is a liquid electrolyte, the cathode fuel is a gas and the cathode plate further includes a gas permeable hydrophobic membrane at the interface between the gas cathode fuel and the catalyst material carried by the distributor part.

5. The boron monoxide fueled primary fuel cell set forth in claim 1 wherein the ionolyte is a liquid electrolyte, the cathode fuel is oxygen supplied by air in the cathode fuel compartment and the cathode plate further includes a gas permeable hydrophobic membrane at the interface between the gas cathode fuel and the catalyst material carried by the distributor part.

6. The boron monoxide fueled primary fuel cell set forth in claim 1 wherein the case has a fluid inlet and a fluid outlet communicating with each compartment to conduct the fluid mediums into and out of their related compartments whereby properly chemically constituted and temperature controlled volumes of said fluid mediums are contained in the compartments during fuel cell operation.

7. The boron monoxide fueled primary fuel cell set forth in claim 1 wherein the ionolyte is a liquid electrolyte and the cathode fuel is a liquid fuel, the case has a fluid inlet and a fluid outlet communicating with each compartment to conduct the fluid mediums into and out of their related compartments whereby properly constituted and temperature controlled volumes of said fluid mediums are contained in the compartments during fuel cell operation.

8. The boron monoxide fueled primary fuel cell set forth in claim 1 wherein the ionolyte is a liquid electrolyte and the cathode fuel is hydrogen peroxide, the case has a fluid inlet and a fluid outlet communicating with each compartment to conduct the fluid mediums into and out of their related compartments whereby properly constituted and temperature controlled volumes of said fluid mediums are contained in the compartments during fuel cell operation.

9. The boron monoxide fueled primary fuel cell set forth in claim 1 wherein the ionolyte is a liquid electrolyte, the cathode fuel is a gas and the cathode plate further includes a gas permeable hydrophobic membrane at the interface between the gas cathode fuel and the catalyst material carried by the distributor part, the case has a fluid inlet and a fluid outlet communicating with each compartment to conduct the fluid mediums into and out of their related compartments whereby properly constituted and temperature controlled volumes of said fluid mediums are contained in the compartments during fuel cell operation.

10. The boron monoxide fueled primary fuel cell set forth in claim 1 wherein the ionolyte is a liquid electrolyte, the cathode fuel is oxygen supplied by air in the cathode fuel compartment and the cathode plate further includes a gas permeable hydrophobic membrane at the interface between the gas cathode fuel and the catalyst material carried by the distributor part, the case has a fluid inlet and a fluid outlet communicating with each compartment to conduct the fluid mediums into and out of their related compartments whereby properly constituted and temperature controlled volumes of said fluid mediums are contained in the compartments during fuel cell operation.

11. The boron monoxide fueled primary fuel cell set forth in claim 1 wherein the electron collector part of the anode plate and the electron distributor part of the cathode plate are liquid and gas permeable metal parts having high indexes of electric conductivity and wherein the catalyst materials carried by the electron collector and distributor parts are established of particulate material and establish a multiplicity of active sites throughout the effective areas of the anode and cathode plates and in close proximity to their related collector and distributor parts.

12. The boron monoxide fueled primary fuel cell set forth in claim 1 whrein the ionolyte is a liquid electrolyte, the cathode fuel is oxygen supplied by air in the cathode fuel compartment and the cathode plate further includes a gas permeable hydrophobic membrane at the interface between the gas cathode fuel and the catalyst material carried by the distributor part, the electron collector part of the anode plate and the electron distributor part of the cathode plate are liquid and gas permeable metal parts having high indexes of electric conductivity and the catalyst materials carried by the electron collector and distributor parts are established of particulate material and established of a multiplicity of active sites throughout the effective areas of the plates and in close proximity to their related collector and distributor parts.

13. The boron monoxide fueled primary fuel cell set forth in claim 1 wherein the case has a fluid inlet and a fluid outlet communicating with each compartment to conduct the fluid mediums into and out of their related compartments whereby properly chemically constituted and temperature controlled volumes of said fluid mediums are contained in the compartments during fuel cell operation, the electron collector part of the anode plate and the electron distributor parts of the cathode plate are liquid and gas permeable metal parts having high indexes of electric conductivity and the catalyst materials carried by the electron collector and distributor parts are established of particulate material and established of a multiplicity of active sites throughout the effective areas of the plates and in close proximity to their related collector and distributor parts.

14. The boron monoxide fueled primary fuel cell set forth in claim 1 wherein the ionolyte is a liquid electrolyte and the cathode fuel is a liquid fuel, the case has a fluid inlet and a fluid outlet communicating with each compartment to conduct the fluid mediums into and out of their related compartments whereby properly constituted and temperature controlled volumes of said fluid mediums are contained in the compartments during fuel cell operation, the electron collector part of the anode plate and the electron distributor parts of the cathode plate are liquid and gas permeable metal parts having high indexes of electric conductivity and the catalyst materials carried by the electron collector and distributor parts are established of particulate material and established of a multiplicity of active sites throughout the effective areas of the plates and in close proximity to their related collector and distributor parts.

15. The boron monoxide fueled primary fuel cell set forth in claim 1 wherein the ionolyte is a liquid electrolyte and the cathode fuel is hydrogen peroxide, the case has a fluid inlet and a fluid outlet communicating with each compartment to conduct the fluid mediums into and out of their related compartments whereby properly constituted and temperature controlled volumes of said fluid mediums are contained in the compartments during fuel cell operation, the electron collector part of the anode plate and the electron distributor parts of the cathode plate are liquid and gas permeable metal parts having high indexes of electric conductivity and the catalyst materials carried by the electron collector and distributor parts are established of particulate material and established of a multiplicity of active sites throughout the effective areas of the plates and in close proximity to their related collector and distributor parts.

16. The boron monoxide fueled primary fuel cell set forth in claim 1 wherein the ionolyte is a liquid electrolyte, the cathode fuel is a gas and the cathode plate further includes a gas permeable hydrophobic membrane at the interface between the gas cathode fuel and the catalyst material carried by the distributor part, the case has a fluid inlet and a fluid outlet communicating with each compartment to conduct the fluid mediums into and out of their related compartments whereby properly constituted and temperature controlled volumes of said fluid mediums are contained in the compartments during fuel cell operation, the electron collector part of the anode plate and the electron distributor parts of the cathode plate are liquid and gas permeable metal parts having high indexes of electric conductivity and the catalyst materials carried by the electron collector and distributor parts are established of particulate material and established of a multiplicity of active sites throughout the effective areas of the plates and in close proximity to their related collector and distributor parts.

17. The boron monoxide fueled primary fuel cell set forth in claim 1 wherein the ionolyte is a liquid electrolyte, the cathode fuel is oxygen supplied by air in the cathode fuel compartment and the cathode plate further includes a gas permeable hydrophobic membrane at the interface between the gas cathode fuel and the catalyst material carried by the distributor part, the case has a fluid inlet and a fluid outlet communicating with each compartment to conduct the fluid mediums into and out of their related compartments whereby propeely constituted and temperature controlled volumes of said fluid mediums are contained in the compartments during fuel cell operation, the electron collector part of the anode plate and the electron distributor parts of the cathode plate are liquid and gas permeable metal parts having high indexes of electric conductivity and the catalyst materials carried by the electron collector and distributor parts are established of particulate material and established of a multiplicity of active sites throughout the effective areas of the plates and in close proximity to their related collector and distributor parts.

* * * * *